United States Patent [19]
Kaede

[11] Patent Number: 4,474,425
[45] Date of Patent: Oct. 2, 1984

[54] PLANAR, OPTICAL STAR COUPLER FOR OPTICAL FIBERS

[75] Inventor: Kazuhisa Kaede, Tokyo, Japan

[73] Assignee: Nippon Electric Co., Ltd., Tokyo, Japan

[21] Appl. No.: 321,015

[22] Filed: Nov. 13, 1981

[30] Foreign Application Priority Data

Nov. 13, 1980 [JP] Japan ................... 55-159731

[51] Int. Cl.³ ........................................... G02B 5/174
[52] U.S. Cl. ............................................... 350/96.16
[58] Field of Search ............... 350/96.15, 96.16, 96.17

[56] References Cited

U.S. PATENT DOCUMENTS

| | | | |
|---|---|---|---|
| 4,210,923 | 7/1980 | North et al. | 350/96.17 X |
| 4,213,670 | 7/1980 | Milton et al. | 350/96.16 |
| 4,262,995 | 4/1981 | Tangonan | 350/96.16 |
| 4,273,445 | 6/1981 | Thompson et al. | 350/96.17 X |

FOREIGN PATENT DOCUMENTS

| | | | |
|---|---|---|---|
| 130143 | 10/1979 | Japan | 350/96.17 |
| 2000877 | 1/1979 | United Kingdom | 350/96.17 |

OTHER PUBLICATIONS

Hsu et al., *Electronics Letters*, vol. 12, No. 16, 5 Aug. 76, "Flip-Chip Approach to Endfire Coupling Between . . . ", pp. 404–405.

*Primary Examiner*—John D. Lee
*Assistant Examiner*—Frank González
*Attorney, Agent, or Firm*—Sughrue, Mion, Zinn, Macpeak & Seas

[57] ABSTRACT

An optical coupler formed on a substrate including a plurality of input and output guide channels and an immediate mixing guide channel connecting the input and output guide channels wherein the optical coupler comprises substantially V-shaped grooves on the substrate disposed in the ends of the input and output guide channels for receiving optical fibers.

7 Claims, 5 Drawing Figures

FIG.1 PRIOR ART
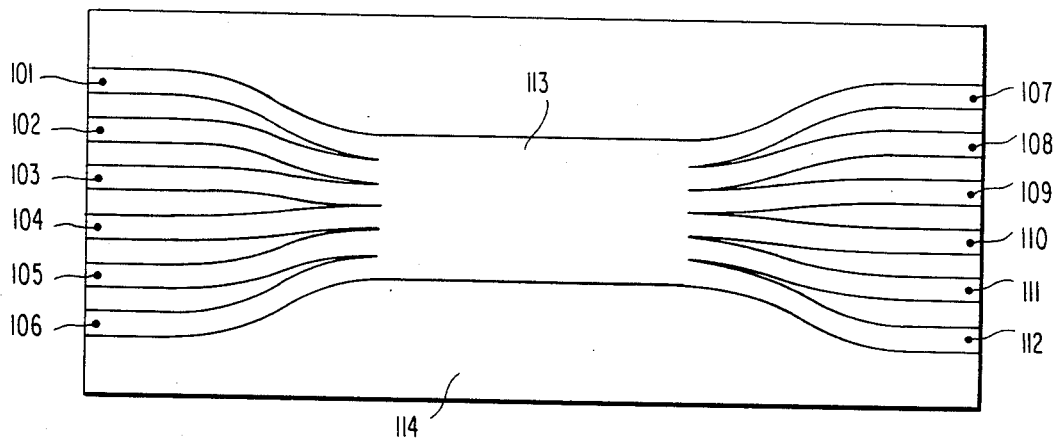
FIG.2a
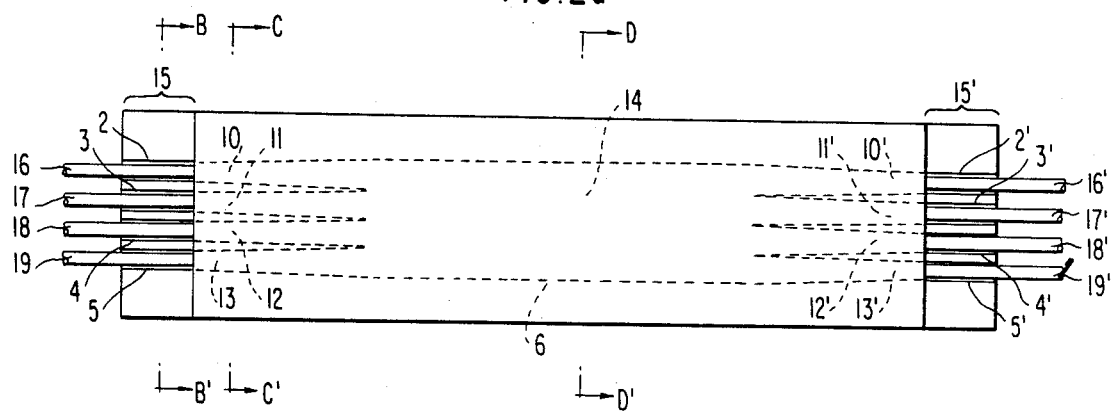
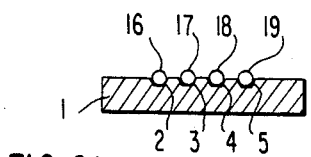
FIG.2b
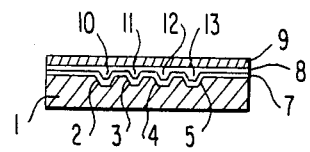
FIG.2c
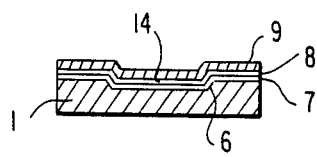
FIG.2d

PLANAR, OPTICAL STAR COUPLER FOR OPTICAL FIBERS

BACKGROUND OF THE INVENTION

The present invention relates to an optical coupler for use with optical fiber communication systems or the like. More particularly, the present invention is concerned with an optical coupler having a plurality of input ports and a plurality of output ports and capable of guiding light incident on a desired one of the input ports to all of the output ports.

With the recent improvement in the quality of optical semiconductor elements and optical fibers, optical communications using optical fibers have made rapid progress in practical usability. The usefulness of such a type of communication has been found in connection with data transmission systems in particular. Where optical communication is applied to a data transmission system, one of the indispensable devices will be an optical coupler which can deliver common data to multiple local stations at the same time.

An optical coupler employing waveguide passages or guide channels formed on a substrate has been proposed by Takado et al., as disclosed in the 1979 National Convention Record of the Institute of Electronics and Communication Engineers of Japan. As shown in FIG. 1, the optical coupler has guide channels which extend from a plurality of input ports 101-106 to a plurality of output ports 107-112 by way of an intermediate mixing section 113. The guide channels are formed on a substrate 114 using polymer material. Light incident on any one of the input ports 101-106 can propagate to all the output ports 107-112 via the mixing region 113. However, since optical fibers must be connected to the optical coupler in practice, the prior art optical coupler requires troublesome manipulation for accurately positioning each optical fiber before fixing it to the optical coupler.

SUMMARY OF THE INVENTION

It is an object of the present invention to provide an optical coupler which is free from the drawback discussed above and which is small in size and readily connectable with optical fibers.

An optical coupler, according to the invention, comprises a plurality of first and second guide channels arranged in the opposite end portions of a substrate; a third guide channel positioned between the first and second guide channels for guiding light from the first guide channels and distributing to the second guide channels; and a plurality of first and second grooves formed on the substrate and adapted to the ends of said first and second guide channels for receiving optical fibers.

In accordance with the present invention, an optical coupler comprises a substrate having on a front surface thereof a generally V-shaped first groove and a plurality of generally V-shaped second grooves extending from opposite ends of the first groove, a first glass layer deposited on the substrate except for opposite end portions thereof substantially complementary to the configuration of the front surface of the substrate, a second glass layer having a larger refractive index than the first glass layer and deposited on the first glass layer to substantially fill up the second grooves, and a third glass layer deposited on the second glass layer and having a refractive index which is smaller than that of the second glass layer, the second grooves being capable of receiving optical fibers individually in opposite end portions thereof which are left uncovered by the glass layers.

The invention precludes troublesome adjustments needed to position optical fibers relative to guide channels.

Other advantages and features of the invention will be more apparent from the detailed description hereunder taken in conjunction with the accompanying drawings.

BRIEF DESCRIPTION OF THE DRAWINGS

FIG. 1 is a plan view showing an example of prior art optical couplers;

FIG. 2a is a plan view of an optical coupler embodying the present invention; and FIGS. 2b-2d are transversal cross sections along lines B-B', C-C' and D-D' of FIG. 2a, respectively.

DESCRIPTION OF THE PREFERRED EMBODIMENT

Referring to FIGS. 2a-2d, an optical coupler comprises a substrate 1 formed of silicon with its front face constituted by the (100) face. Four generally V-shaped grooves 2-5 and another four generally V-shaped grooves 2'-5' extend in opposite end portions of the front face of the substrate 1 in a crystal orientation of <110>, respectively. The typical aperture and bottom widths of those grooves 2-5 and 2'-5' are 95 microns and 60 microns, respectively. The depth of the grooves may typically be 25 microns. These grooves commonly converge into a generally V-shaped comparatively wide groove 6 having a 465 micron bottom width, a 500 micron aperture width and a 25 micron depth in an intermediate portion of the substrate 1. All these grooves on the substrate 1 are formed by selective etching using a photolithographically prepared mask. A first glass layer 7 is deposited on the top of the substrate 1 except for opposite end portions 15 and 15' of the latter, in a thickness small enough to preserve the recessed configuration of the grooves. Deposited on the first glass layer 7 is a second glass layer 8 whose refractive index is larger than that of the first glass layer 7. This glass layer 8 has such a thickness distribution that it substantially fills up the grooves 2-5 and 2'-5' at least in their portions which are not joined together. Furthermore, a third glass layer 9 is formed on the second glass layer 8 with a refractive index smaller than that of the latter. The first to third glass layers 7-9 may be formed on the substrate in succession by the chemical vapor deposition method based on the oxidation reaction of $SiH_4$ and $O_2$ under the application of heat. The typical thicknesses of those layers 7, 8 and 9 are 25 microns, 60 microns and 15 microns, respectively. The first and third glass layers 7 and 9 may contain $B_2O_3$ as their dopant while the second glass layer 8 may contain $GeO_2$ as its dopant. These dopants control the refractive index of the second glass layer 8 which is larger than those of the first and third glass layers 7 and 9. Thus, the second glass layer 8 constitutes guide channels 10-14 due to the refractive index larger than those of the adjacent glass layers coupled with inherent convexity directed downward.

In the course of deposition of the first to third glass layers 7-9, opposite end portions 15 and 15' of the substrate 1 including the grooves 2-5 and 2'-5' are shielded by coverings. The product therefore does not have any glass layer on the surface areas on the opposite end portions 15 and 15' with the grooves 2-5 and 2'-5' left exposed. It is possible in this situation to set up effective optical connection of first to eighth optical fibers 16-19 and 16'-19' of 125 micron diameter to the guide channels 10-13 and 10'-13', respectively, merely by laying the otical fibers on the respective V-shaped grooves 2-5 and 2'-5'.

The guide channels 10-13 and 10'-13' make up an optical coupler having four input ports and four output ports with an intermediate guide channel 14. For convenience of description, the guide channels 10-13 will be referred to as first to fourth input ports hereinafter, the guide channels 10'-13' as first to fourth output ports, and the intermediate guide channel 14 as a mixing region.

A light ray propagated through the first optical fiber 16, for example, becomes incident on the first input port 10 which is optically connected with the fiber 16. The input ray propagates from the first input port 10 to the mixing region 14 where it spreads out spatially to reach the first to fourth output ports 10'-13' and therefrom to the associated fifth to eighth optical fibers 16'-19'. Likewise, each light ray passed through the second to fourth optical fibers 16-19 is distributed to the fifth to eighth optical fibers 16'-19'.

In accordance with this embodiment, the first to eighth optical fibers 16-19 and 16'-19' can be in effective optical connection with the guide channels 10-13 and 10'-13' individually only if placed in the corresponding V-shaped grooves 2-5 and 2'-5'. This precludes the troublesome operations heretofore needed to position optical fibers relative to guide channels. Accordingly, not only is the number of steps necessary for the production of optical couplers cut down but optical fibers can be positioned accurately without any unevenness relative to such optical couplers.

While the present invention has been shown and described as employing four V-shaped grooves on each end of a substrate, it will be apparent to those skilled in this art that the effect obtainable with the invention remains the same if five or more grooves are employed.

In the embodiment shown and described, the substrate is made of silicon and a lithographic technique is used to form V-shaped grooves thereon. Alternatively, glass may be employed to form the substrate and, in this case, the V-shaped grooves will be shaped by pressing the glass substrate in a softened state.

Furthermore, GeO$_2$ used as a dopant in the second glass layer to increase its refractive index relative to the others may be replaced by P$_2$O$_4$ or a composite dopant of GeO$_2$ or P$_2$O$_4$ and B$_2$O$_3$.

It will be seen from the foregoing that the present invention provides an optical coupler which is small in size and permits optical fibers to be connected readily therewith due to omission of intricate positioning of the optical fibers relative to the coupler.

Various modifications will become possible for those skilled in the art after receiving the teachings of the present disclosure without departing from the scope thereof.

What is claimed is:

1. An optical coupler comprising:
   a substrate having a first surface;
   a first wide groove formed in said surface and extending substantially across said surface;
   a plurality of second and third grooves narrower than said first groove formed in the opposite ends of said surface and connecting with said first groove;
   a first thin glass layer deposited on said grooved surface except for the opposite end portions thereof and conforming to said grooves such that the upper surface thereof corresponds to said grooved configuration;
   a second glass layer deposited on said first glass layer which substantially fills said second and third grooves and which has a larger refractive index than that of said first glass layer;
   a third glass layer deposited on said second glass layer having a refractive index which is less than that of said second glass layer, and
   individual optical fibers arranged in said second and third grooves at the end portions thereof which are not covered by said glass layers.

2. The optical coupler of claim 1, wherein said second and third grooves are substantially V-shaped.

3. The optical coupler of claim 1, wherein each of said second and third grooves has opposite side faces intersecting in extended faces.

4. The optical coupler of claim 1 or 3, wherein said first groove has a flat bottom.

5. The optical coupler of claim 1 or 3, wherein said substrate is formed of silicon with said first surface constituted by a (100) plane.

6. The optical coupler of claim 5, wherein said first, second and third grooves are formed in a crystal orientation of <110> of said silicon.

7. The optical coupler of claim 1, wherein said substrate is formed of glass, and said first and second grooves are formed by pressing said substrate while the same is in a softened state.

* * * * *

UNITED STATES PATENT AND TRADEMARK OFFICE
CERTIFICATE OF CORRECTION

PATENT NO. : 4,474,425

DATED : October 2, 1984

INVENTOR(S) : Kazuhisa Kaeda

It is certified that error appears in the above-identified patent and that said Letters Patent is hereby corrected as shown below:

Column 3, line 7, "otical" should read -- optical --.

Signed and Sealed this

Ninth Day of April 1985

[SEAL]

Attest:

DONALD J. QUIGG

Attesting Officer

Acting Commissioner of Patents and Trademarks